United States Patent
Hernacki et al.

(10) Patent No.: US 8,661,250 B2
(45) Date of Patent: *Feb. 25, 2014

(54) REMOTE ACTIVATION OF COVERT SERVICE CHANNELS

(75) Inventors: Brian Hernacki, San Carlos, CA (US);
Thomas Lofgren, Sunnyvale, CA (US);
Jeremy Bennett, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/079,767

(22) Filed: Mar. 28, 2008

(65) Prior Publication Data

US 2008/0184344 A1    Jul. 31, 2008

Related U.S. Application Data

(63) Continuation of application No. 10/677,732, filed on Oct. 2, 2003, now Pat. No. 7,380,123.

(51) Int. Cl.
*H04L 9/32* (2006.01)

(52) U.S. Cl.
USPC .......................................... 713/168; 713/154

(58) Field of Classification Search
USPC ...................................... 713/168, 154; 726/3
See application file for complete search history.

(56) References Cited

U.S. PATENT DOCUMENTS

| | | | |
|---|---|---|---|
| 5,414,833 A | 5/1995 | Hershey et al. | |
| 5,574,912 A | 11/1996 | Hu et al. | |
| 5,901,284 A | 5/1999 | Hamdy-Swink | |
| 6,112,246 A | 8/2000 | Horbal | |
| 6,202,156 B1 | 3/2001 | Kalajan | |
| 6,412,001 B1 | 6/2002 | Wong et al. | |
| 6,831,890 B1 | 12/2004 | Goldsack et al. | |
| 7,024,478 B1 * | 4/2006 | Dalgic et al. | 709/225 |
| 7,380,123 B1 | 5/2008 | Hernacki et al. | |
| 2003/0101353 A1 * | 5/2003 | Tarquini et al. | 713/200 |
| 2005/0163131 A1 * | 7/2005 | Tonnby et al. | 370/395.53 |

OTHER PUBLICATIONS

Martin Krzywinski, Genome Sciences Center, Port Knocking flexible Security through authentication across closed ports, Nov. 17, 2003. pp. 1-26, portknokcing.org Retrieved date Sep. 5, 2009.*
Martin Krzywinsk, Port Knocking Jun. 2003, 1$^{st}$ reference 12 pages and the second one 3 pages.*

(Continued)

*Primary Examiner* — Samson Lemma
(74) *Attorney, Agent, or Firm* — Wilmer Cutler Pickering Hale and Dorr LLP

(57) ABSTRACT

Remote activation of covert service channels is provided. A remote host can initiate and establish a connection with a target host without exposing a service channel or communications port to an unauthenticated host. Triggers can be received by and sent to a host and an associated operating system, under direction of a stealth listener. The stealth listener provides can control and direct an operating system to respond to incoming data packets, but can also open and close ports to enable access to services on a host. Using a variety of transport mechanisms, protocols, and triggers to covertly enable a connection to be established between a service and a remote client, the disclosed techniques also enable reduction of processing and storage resources by reducing the amount of host or client-installed software.

20 Claims, 9 Drawing Sheets

(56) References Cited

OTHER PUBLICATIONS

Anonymous, Google web definition; retrieved date Jun. 14, 2007.
Paul Baiham et al. "Techniques for Lightweight Concealment and Authentication in IP Networks" Intel Corporation, Jul. 2002.
Christian Borss "Drop/Deny vs. Reject" Oct. 7, 2001: http://www.lk.etc.tu-bs.de/lists/archiv/lug-bs/2001/msg05734.html.
Jeff Hayes, Smart Cards, Biometrics and Tokens for VLANS and Subnet Access, Dec. 2001. ALCATEL e-Business Networking Division, pp. 1-9, See in particular p. 4, slide 7, retrieved date Jan. 12, 2007.
Martin Krzywinski "Port Knocking Details: Applications of Port Knocking" http://www.portknocking.org/view/details/application. According to archive.org., appears to have been published at least as soon as Jul. 18, 2003.
Martin Krzywinski "Port Knocking" Linux Journal, Jun. 16, 2003: http://linuxjournal.com/article6811.
Martin Krzywinski, "Port Knocking; About; Obscurity": http://www.portknocking.org/view/about/obscurity.According to archive.org, appears to have been published at least as soon as Jul. 18, 2003.
Martin Krzywinski, "Port Knocking; Details; Data Transfer Across Closed Ports" http://www.portknockingorg/view/ details/transfer. According to archive.org., appears to have been published at least as soon as Apr. 5, 2004.
Martin Krzywinski, "Port Knocking; Details; Download Perl Prototype": http://www.portknocking.org/view/details/download. According to archive.org, appears to have been published at least as soon as Apr. 5, 2004.
Martin Krzywinski, "Port Knocking; Details; Overview of Port Knocking": http://www.portknocking.org/view/details According to archive.org, appears to have been published at least as soon as Jul. 19, 2003.
Martin Krzywinski, "Port Knocking; Documentation; knockclient" http://www.portknocking.org1view/documenlation. According to archive.org, appears to have been published at least as soon as Jul. 26, 2003.
Martin Krzywinski, "Port Knocking; Documentation; knockdaemon" http://www.portknocking.org/view/documentation/knockdaemon According to archive.org, appears to have been published at least as soon as Jun. 18, 2003.
Martin Krzywinski, "Port Knocking; Documentation; read.me": http://www.portknocking.org1view!documentation/readme. According to archive.org, appears to have been published at least as soon as Jul. 18, 2003.
Martin Krzywinski, "Port Knocking; Download; Perl": http://www.portknocking.org/view/download/perl According to archive.org, appears to have been published at least as soon as Jul. 26, 2003.
Martin Krzywinski, "Port Knocking; FAQ; applications": http://www.portlenocking.org/view/faq/applications. According to archive.org, appears to have been published at least as soon as Jul. 18, 2003.
Martin Krzywinski, "Port Knocking; FAQ; Comments" http://www.portknocking.org/view/faq/comments. According to Archive.org, appears to have been published at least as soon as Jul. 18, 2003.
Martin Krzywinski, "Port Knocking; FAQ; general": http://www.portknocking.org/view/faq. According to archive.org, appears to have been published at least as soon as Jul. 18, 2003.
Martin Krzywinski, "Port Knocking; FAQ; implementations" http://www.portknocking.org/view/faq/implemenlations According to archive.org, appears to have been published at least as soon as Jul. 2003.
Martin Krzywinski, "Port Knocking; FAQ; mechanism": http://www.portknocking.org/view/faq/mechanism , According to archive.org, appears to have been published at least as soon as Jul. 18, 2003.
Martin Krzywinski, "Port Knocking; FAQ; Security": http//www.portknocking.org/view/faq/security According to archive.org, appears to have been published at least as soon as Jul. 18, 2003.
Martin Krzywinski, "Port Knocking; Features of Port Knocking": http//www.portknocking.org/view/about/features. According to archive.org, appears to have been published at least as soon as Jul. 18, 2003.
Martin Krzywinski, "Port Knocking; Port Knocking Lab; Lab Instructions"; http://www.portknocking.org/view/knocklab According to archive.org, appears to have been published al least as soon as Jul. 18, 2003.
Martin Krzywinski, "Port Knocking; Port Knocking Requirements" http://www.portknocking.org/view/about.requirements.According to archive.org, appears to have been published at least as soon as Jul. 18, 2003.
Martin Krzywinski, "Port Knocking; Summary of Port Knocking", http://www.portknocking.org According to archive.org., appears to have been published at least as soon as Jul. 18, 2003.
Martin Krzywinski, "Port Knocking; What is Port Forwarding": http://www.portknocking.org/view/about/port_forwarding According to archive.org, appears to have been published at least as soon as Jul. 18, 2003.
Martin Krzywinski, "Port Knocking; What is Port Triggering": http://www.portknocking.org/view/about/port_triggering According to archive.org, appears to have been published at least as soon as Jul. 18, 2003.
Martin Krzywinski. "Port Knocking; Details; Spoofing Eavesdroppers" http://www.portknocking.org/view/details/spoofing. According to archive.org., appears to have been published at least as soon as Jul. 18, 2003.
Martin Krzywinski. "Port Knocking; Knocklab; knock_lab": http://www.portknocking.org/view/knocklab/knock_lab. According to archive.org, appears to have been published at least as soon as Jul. 18, 2003.

* cited by examiner

REMOTE ACTIVATION OF COVERT SERVICE CHANNELS

CROSS REFERENCE TO OTHER APPLICATIONS

This application is a continuation of U.S. patent application Ser. No. 10/677,732, entitled REMOTE ACTIVATION OF COVERT SERVICE CHANNELS filed Oct. 2, 2003 now U.S. Pat. No. 7,380,123 which is incorporated herein by reference for all purposes.

FIELD OF THE INVENTION

The present invention relates generally to security software. More specifically, remote activation of covert service channels is disclosed.

BACKGROUND OF THE INVENTION

Network services are deployed to provide various types of functionality to enable both local and remote users to employ resources on a particular client (client may refer to any computing system, server, client, or computer). However, network services can also be a primary point of vulnerability that attackers can use to exploit and compromise a system. One of the primary security problems with deploying network services is that in order to be functional, a service running on a client is externally exposed. That is, network services on a client can be accessed by remote hosts or users via an external communications port on the local client. This external exposure can also be exploited for the purposes of an attack or hack.

While many network services have mechanisms for access control, these mechanisms still require that at least some initial traffic be processed in order to make an access control judgment. Conventional authentication techniques still provide an opportunity for an unauthenticated client or attacker to access a client. For example, if authentication is performed by restricting access to a list of authorized IP addresses, an initial packet must still be received and decoded in order to determine a source or destination IP address. Other forms of authentication may require processing several packets, thus providing a window for an attacker to gain illegitimate access to a client. For example, numerous buffer overflow applications can exploit these windows to gain access to control systems (e.g. imapex2 authentication buffer overflow). Even without a response packet from the target client, the attacker knows that a service or set of services is exposed and can be attacked. Many attackers begin by probing or scanning for systems and services. Once they locate a service, they attempt to identify it and then use that information to launch an actual attack. Conventional solutions to these problems are limited in terms of either granularity or overhead.

Thus, there is a need for a solution that allows remote and secure access to private network services while preventing unauthenticated access.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to one embodiment, techniques are provided for disclosing a mechanism that can be used on a server to monitor for triggers and enable dynamic, remote, and secure access to a service or set of services via an external communications port. Examples of services include applications, programs, and clients that can be used to gain access to system resources and ports. Triggers, as described below, can be any type of data packet received at a host, such as a probe, scan, or other data traffic. The techniques disclosed can prevent a service from being detected by a remote host employing 'port scanning,' but can also allow access by statically listed and dynamically-occurring authorized users, all from remote locations. Significant overhead on the client, the network or the administrators is subsequently reduced. These techniques can be used to provide a higher level of security to exposed services, while increasing availability and lowering administrative overhead.

Figure 1A:
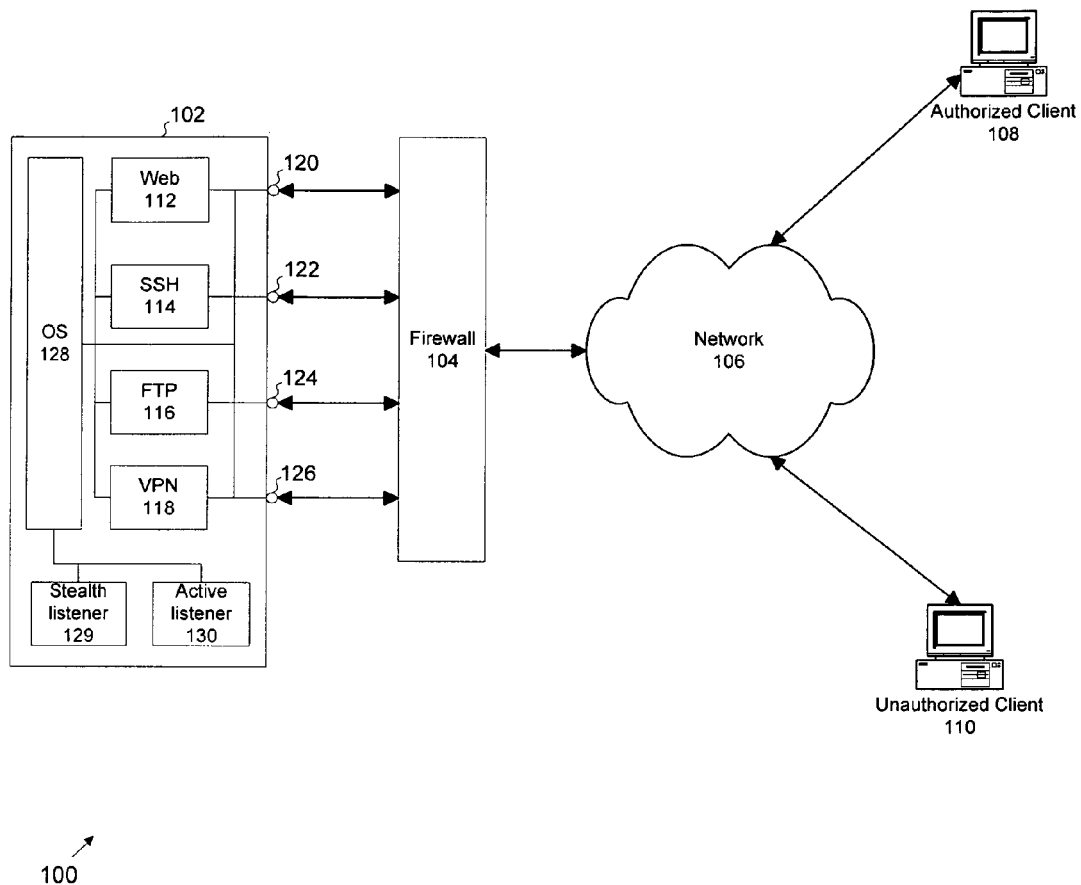
FIG. 1A illustrates a system for remotely activating a covert service channel in accordance with an embodiment of the present invention.

FIG. 1A illustrates a system for remotely activating a covert service channel in accordance with an embodiment of the present invention. System 100 includes a host 102, a firewall 104, and network 106 for transferring data with remote clients 108 and 110. Remote client 108 is illustrated as an authenticated (or authorized) client. Remote client 110 is illustrated as an unauthenticated (or unauthorized) client. The difference between authenticated (authorized) and unauthenticated (unauthorized) may include whether the remote clients 108, 110 are permitted to establish a connection and transfer data with host 102. In this example, remote client 108 is authenticated and permitted to transfer data, as explained below, with host 102. In contrast, remote client 110 is not authenticated and thus prevented, also discussed below, from establishing a connection and exchanging data with host 102.

Included within host 102 are several services. Web service 112, secure shell (SSH) service 114, file transfer protocol (FTP) service 116, and virtual private network (VPN) 118 are shown as implemented applications on host 102. In other embodiments, some, none, or more services may be included on host 102. Also included on host 102 are ports 120-126. Ports 120-126 may be in a variety of states including open, closed, or unavailable. Control of the ports can be, preferably, managed by an operating system 128. Operating system 128 can determine and direct the individual ports into an open or close stated. Also shown in this example are stealth listener 129 and active listener 130.

According to one embodiment, stealth listener 129 and active listener 130 can be configured to monitor network connections on host 102 for incoming data traffic or packets. Stealth listener 129 can be configured to monitor an individual, range, or set of ports on host 102. Additionally, stealth listener 129 can be configured to monitor a port with particular regard to a specific service that may be running on the port and any automatic or user-configured rules/policies. Packets received at host 102 may be monitored by stealth listener 129, either directly or via OS 128 to determine if a "trigger" is included in an incoming packet.

A trigger can be any type of data packet sent from a remote client to a host. Examples of possible triggers include probes, scans, connection requests, but may also be configurable and defined at the host as events that enable or "trigger" protective measures by stealth listener 129. In one embodiment, triggers may be received or sent by host 102, used to provide indications or instructions to remote clients 108, 110 that a connection can be established with a service. Triggers can be received by host 102 having security applications installed, such as those described herein. In one embodiment, factors that affect the determination of acceptable triggers include security, stealth or likelihood of detection, and ease of use. Preferably, a trigger should be difficult to forge, replace, or duplicate. The trigger is also preferably difficult to detect. A trigger also preferably requires little or no modification of the host system. Preferably, by using common system tools already installed on a host to generate a trigger, the need for installing additional software can be eliminated. By reducing the burden on the storage, processing, and other resources of a particular host, a trigger may be used on a much more widespread basis. For example, where personal firewall or VPN software is installed, the number of users may be restricted. However, using a system such as the implementations described herein may provide similar security for every individual host without requiring large software packages.

Common system tools can be used to generate the trigger. In one embodiment, resource burdens are reduced by requiring no additional software installation and may enable a user to access a host from any remote client. Although some embodiments may include the installation of a stealth listener and a trigger application, existing, installed host applications such as common system tools can also be used to generate a trigger. A variety of transport mechanisms can be used for a trigger. Passwords, packet sent in a pre-defined sequence, scanning or probing ports in a specific sequence, shared secrets, and other keys can be used as a transport mechanism for a trigger.

In one embodiment, a trigger can be disguised as general background traffic in order to deceive any remote hosts that may be attempting to observe traffic going or coming from a particular port or host. For example, a response can appear as though it is backscatter. In other examples, secure triggers can be provided by bundling the trigger with an additional key. The key can be encrypted or plain. The additional key can prevent a remote host from simply recording and replaying the trigger to gain access.

Triggers can also be used with varying transport protocols/mechanisms. For example, a common tool such as "ping" (which sends ICMP ECHO_REQUEST messages) can be used. The payload portion of a packet can be set to a particular key value that provides validation. A similar approach can be performed using telnet. As telnet can be used to gain access to a specific port, a remote host can use a series of ports as a type of combination lock. If ports are probed in a particular combination, then the trigger is validated. Further security (e.g., prevent forgery, replay, etc.), local or portable tools (e.g., software on a USB "thumb drive") can be used to create a time-stamped cryptographic payload. Alternative triggers may include the use of various forms of back scatter (meaningless data packets "scattered" in response to a probe or connection request), and broadcast messages. Stealth listener 129 can be deployed on the host 102 or on a separate client or server, such as firewall 104. Further, firewall 104 can be included or not included with the system, but may be advantageous in a multiple host implementation. However, in the illustrated embodiment, stealth listener 129 may be integrated with host 102 in order to provide direct protection from intrusions, hacks, denial of service, or other attacks. Deployment of a stealth listener 129 and active listener 130 can be implemented similar to an internet daemon or "inetd" file, such as those found on Unix systems. In such a deployment, stealth listener 129 can provide protection to services 112-118 on host 102 by blocking security holes (i.e., file transfers not requiring usernames or passwords) and vulnerabilities.

Figure 1B:
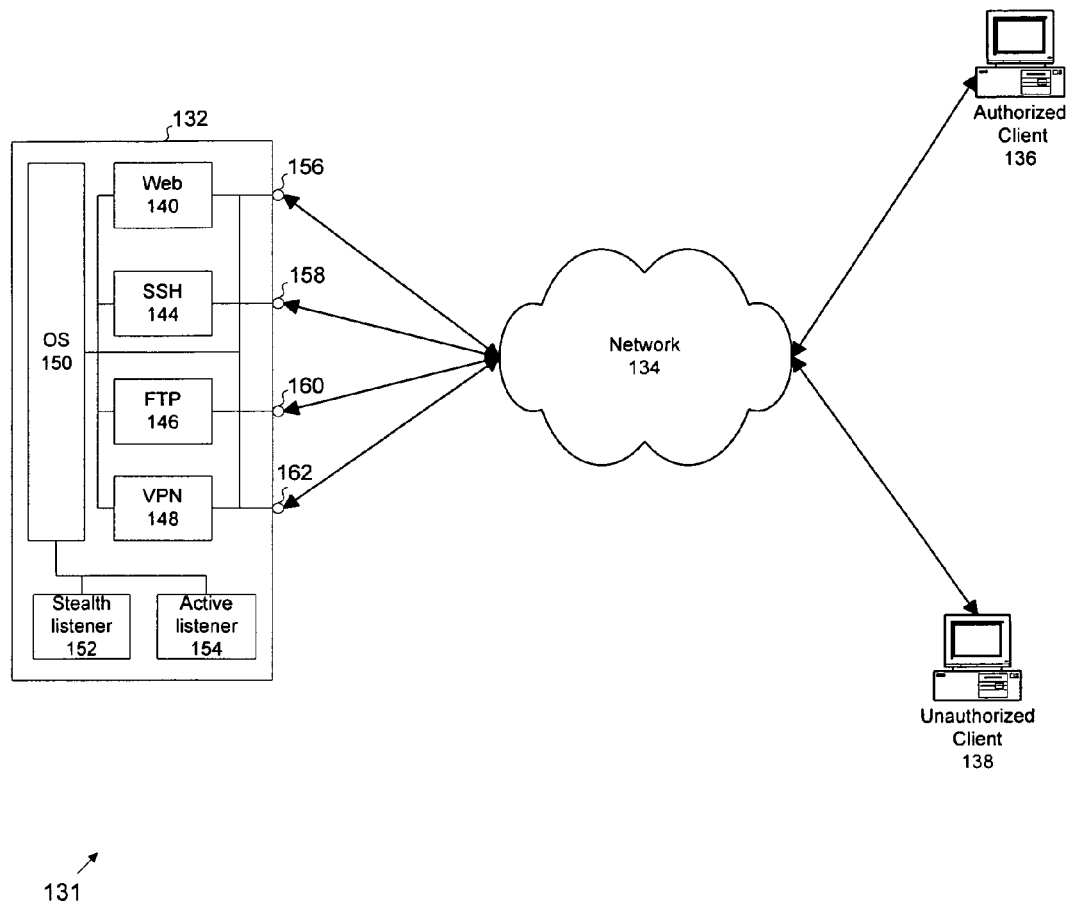
FIG. 1B is another illustration of a system for remotely activating a covert service channel in accordance with an embodiment of the present invention.

FIG. 1B is another illustration of a system for remotely activating a covert service channel in accordance with an embodiment of the present invention. A host 132 can communicate over network 134 with remote clients 136 and 138. Remote (authenticated) client 136 and remote (unauthenticated) client 138 may pass and attempt to establish a connection with host 132.

Included in host 132 are network services 140-148, operating system 150, stealth listener 152, active listener 154, and ports 156-162. The components shown in FIG. 1B are similar to those in FIG. 1A. However, firewall 104 (FIG. 1A) is not included in FIG. 1B. In this embodiment, remote clients 136 and 138 may be able to request and establish a connection with host 132 directly rather than through a firewall. In other embodiments, fewer or more remote clients may be listed. As mentioned above, active listener 205 is included. In one embodiment, active listener 205 monitors a port for a "one-time" connection request from a trigger's source. In other words, active listener 205 can monitor for a single probe, scan, or connection request from a remote client seeking to establish a connection with a service on a particular port. Unlike stealth listener 204, which provides general protection in accordance with embodiments disclosed herein, active listener is a targeted application intended to protect specific resources on host 202. Listeners 204, 205 can be complementary, intended to supplement each other for the protection of host 202.

Figure 2A:
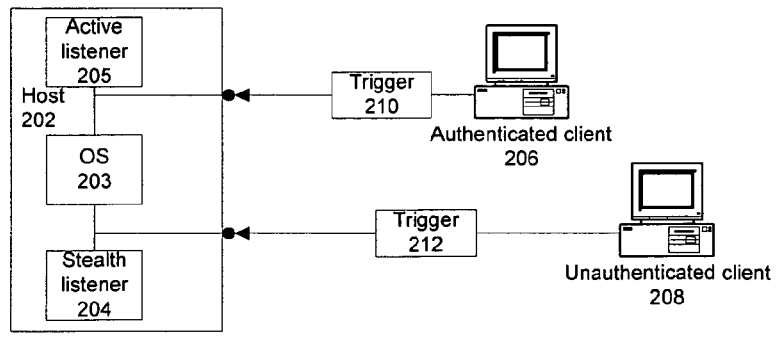
FIG. 2A illustrates a channel activation system in accordance with an embodiment of the present invention.

FIG. 2A illustrates a channel activation system in accordance with an embodiment of the present invention. A host 202 is shown as having an operating system, an active listener 205, and a stealth listener 204 that can receive triggers 210 and 212 from remote clients 206 and 208. Stealth listener 204 can be implemented as a passive packet "sniffer" (an application that passively receives network traffic) and rely on operating system 203 to generate and send a deceptive response packet (such as a "port unreachable" ICMP message, as explained below). As an example, this can enable stealth listener 204 to monitor incoming data traffic and direct response packets to be sent by the operating system.

As response packets can be generated by operating system 203 as directed by stealth listener 204 or active listener 205, unauthenticated remote client 208 preferably can not determine whether response packets are being provided by a security application such as stealth listener 204 or active listener 205.

Active listener 205 can prevent discovery of a particular service on the port by directing the operating system to send a response packet, as described above. Active listener 205 can take several forms. In one embodiment, active listener 205 can be persistent or transient. If persistent, active listener 205 determines whether a particular port or traffic filter should be monitored (e.g., local host firewall such as ipfilters or ipchains). If active listener 205 is transient, it can initiate monitoring of a specific port, as necessary. In another embodiment, an aging policy can be configured and invoked to increase the efficiency of the system so as to permit active listeners to enter a standby mode until a packet is received.

Figure 2B:
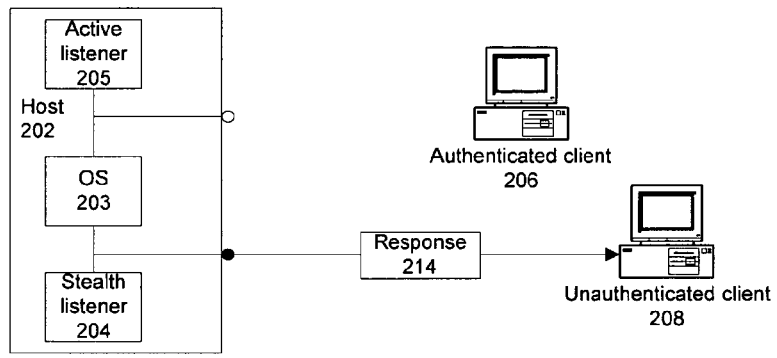
FIG. 2B is a further illustration of a channel activation system in accordance with an embodiment of the present invention.

FIG. 2B is a further illustration of a channel activation system in accordance with an embodiment of the present invention. In this example, upon receiving triggers, a response may be sent to remote client 206, 208. In the example shown, a response packet 214 can be sent by host 202 to the unauthenticated remote client 208. The response packet may use one of several transport mechanisms (e.g., UDP, TCP, ICMP, etc.). For example, an ICMP message indicating "port unreachable" can be sent to unauthenticated remote client 208 indicating that a port on host 202 is not available for establishing a connection. The message is generated and sent by operating system 128, 150 to unauthenticated remote client 208. The response packet 214 therefore appears as a system response from operating system 128, 150 and not a crafted response from a security application on host 202.

In the above example, using the Internet Control Message Protocol (ICMP), type 3, code 3 as a transport mechanism for a response packet enables stealth listener 129 to direct operating system 203 to send a message indicating that a particular port was unreachable. By directing operating system 203 to send a system response, the remote client that sent trigger 212 can receive a confirmation via a transport mechanism/protocol (e.g., ICMP, UDP, TCP, etc.) that a particular port cannot be reached. Subsequently, the unauthenticated remote client 208 may divert subsequent port scans, probes, or data traffic to another host. Unauthenticated remote client 208, upon receipt of the port unreachable message, may conclude that either the receiving host is unreachable, unavailable or non-existent. Other types of deceptive responses can also be sent by the stealth listener. However, the stealth listener can invoke different reactions upon receipt of a valid trigger.

The authenticated remote client 206 might not receive a response packet. In the example shown, host 202 does not send a response packet to authenticated remote client 206. Trigger 210 sent by authenticated remote client 206 to host 202 activates the stealth listener 204. Trigger 210 may be authenticated, as described below in order to enable a connection to be established between authenticated remote client 206 and host 202.

Figure 2C:
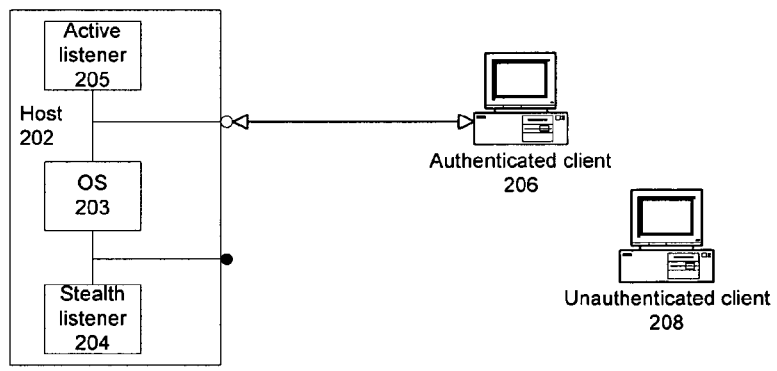
FIG. 2C illustrates a channel activation system with an established connection, in accordance with an embodiment of the present invention.

FIG. 2C illustrates a channel activation system with an established connection, in accordance with an embodiment of the present invention. After trigger 210 has been authenticated, host 202 opens a port in order to enable a network service to establish a connection with authenticated remote client 206, as shown.

A number of alternative embodiments may be envisioned. With regard to generating response packets, an alternative embodiment can include stealth listener 204, 303 which may or may not send a response packet 214, 314 to a remote client, even if the trigger 214, 314 is valid. In other embodiments, the host 202, 301 may send a response packet 214, 314 providing additional information providing a particular service port, a configurable time period in which to establish a connection, or data that would enable a remote client to identify and connect with host 202, 301. Response measures may vary in other implementations and are not limited to the above example. For example, an implicit pre-defined agreement may be configured to determine how a remote client can connect with a service on host 202, 301.

Figure 3A:
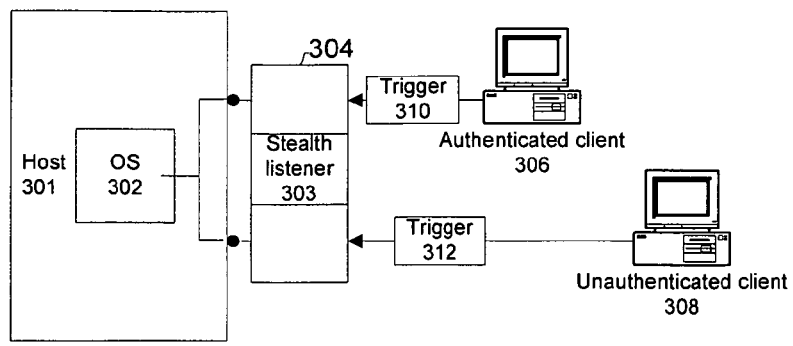
FIG. 3A illustrates a channel activation system receiving triggers in accordance with an alternative embodiment of the present invention.

FIG. 3A illustrates a channel activation system receiving triggers in accordance with an alternative embodiment of the present invention. In this example, a host 301 is shown to use a firewall 304 to communicate with authenticated remote clients 306 and 308. In this example, firewall 304 intercepts incoming data traffic to host 301 (including operating system 302) such as triggers 310, 312. As described above, stealth listener 303 monitors/listens for triggers 310, 312 from remote clients 306, 308. However, in this example, triggers 306, 308 are intercepted first at firewall 304 that includes stealth listener 303. In other embodiments, an active listener 205 may be included with firewall 304, may replace stealth listener 303, or may be integrated with stealth listener 303 into a single listener.

Figure 3B:
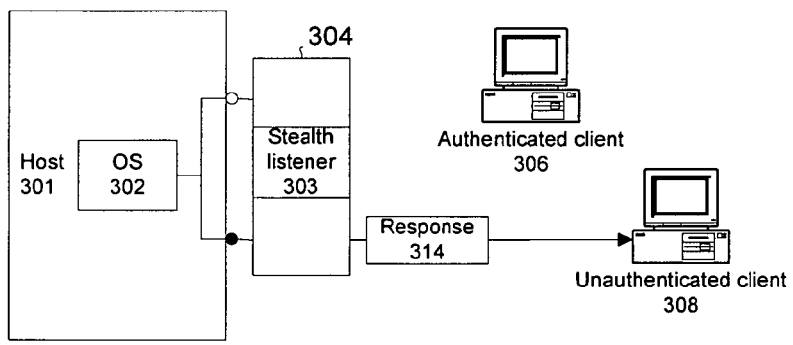
FIG. 3B illustrates a channel activation system sending a response in accordance with an alternative embodiment of the present invention.

FIG. 3B illustrates a channel activation system sending a response in accordance with an alternative embodiment of the present invention. In the case of proper authentication, such as that from authenticated remote client 306, no response packet will be sent from host 302 in this example. In the case of an unauthenticated remote client such as 308, a response packet may be sent from operating system 302. From firewall 304, operating system 302 generates and sends a response packet 314 back to unauthenticated remote client 308 indicating that the host and its ports are unreachable.

Figure 3C:
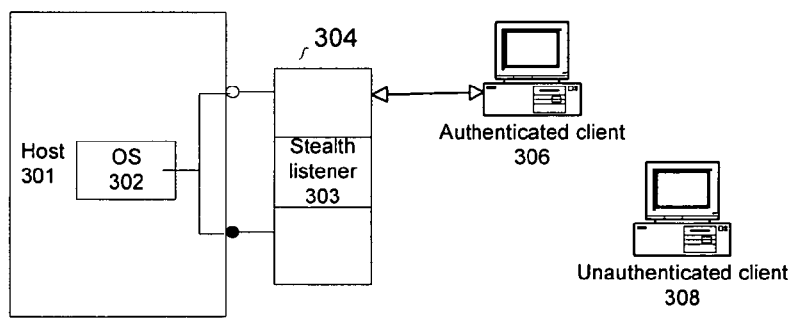
FIG. 3C illustrates a channel activation system activating a channel with a remote client in accordance with an embodiment of the present invention.

FIG. 3C illustrates a channel activation system activating a channel with a remote client in accordance with an embodiment of the present invention. Host 301, after sending a response packet 314 a port may be opened to allow a connection to be established through firewall 304 with authenticated remote client 306. By not sending response data, which can be monitored by an attacker, in response to a properly authenticated trigger, host 301 can enable a network service. The network service may be located on a port on host 301. Once open, the authenticated remote client 306 can send a connection request to host 301 and establish a connection.

Figure 4:
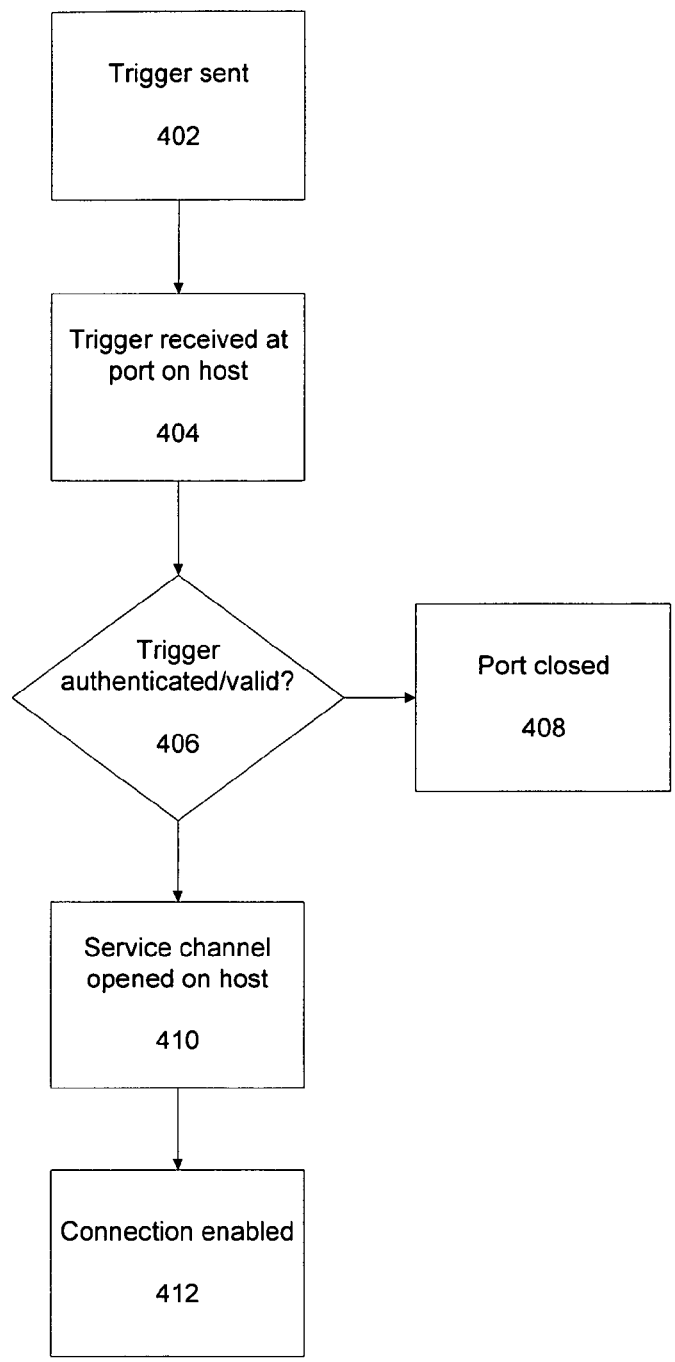
FIG. 4 illustrates a method for activating a service channel in accordance with an embodiment of the present invention.

FIG. 4 illustrates a method for activating a service channel in accordance with an embodiment of the present invention. In this example, trigger 210 can be sent to host 202 (402). Trigger 210 may be received at the host on a port or set of ports (404). Using a variety of transport mechanisms and protocols (i.e., connection vs. connectionless), trigger 210 can enable a remote client to establish a connection (e.g., authenticated remote client 206). With regard to establishing connection between a host and authenticated remote client 206, a connection-oriented protocol can be used. After a valid trigger (i.e., 210, 310) is received using secure shell (SSH), a remote client may then assume a connection to the host can be made on a port with the SSH service available to it. In other embodiments that rely on connectionless protocols (i.e., UDP), the method illustrated in FIG. 4 may be used. In another example, the remote client may provide information such as a requested service port with the trigger, indicating a specific port over which to establish a connection. Other information, such as a connection request, can be included with trigger 210, 310. Stealth listener 204 can authenticate trigger 210 (406).

As an example of authentication, remotely accessing a web server may require directing or "pointing" a web browser to attempt to connect to three ports protected by a stealth listener. In one embodiment, packets are sent to the three ports in a specific sequence. The stealth listener recognizes the three port connection requests as a valid trigger, but uses the operating system to send ICMP messages from the three ports back to the web browser. In this example, the three port connection requests form a valid trigger, although the three connection attempts failed.

Continuing the above example, after failing to connect to the three ports, say, ports 21, 23, and 26, remote client points a web browser to pre-determined port 80 on the host. Port 80 can be used to establish connections with authenticated remote clients, if a trigger is validated. In this example, port 80 is the designated service port for establishing a web connection. The proper sequence of attempts to the three ports can be observed, for example, by stealth listener 303. In this example, the three failed port connection requests to ports 21, 23, and 26 constituted a valid trigger. Once the trigger was received in the proper sequence, the trigger was authenticated. Upon receipt of the valid trigger, the stealth listener opened port 80 for establishing a connection. In this case, no additional software was required. Web browsing software is typically pre-installed on a host computer, thus the trigger was created by the web browser's behavior in this example. Using a web browser, the host can be remotely accessed by a user or administrator on any remote client with web browsing software, but the host's service channels are effectively hidden from random port scanners. With some services, a firewall can be used to implement active listener 205, stealth listener 303, or a combination of either for monitoring multiple connections (i.e., HTTP services).

If trigger 210 is not authenticated, then the port that trigger 210 was received on remains closed (408). If trigger 210 is authenticated, the port and passively wait for a connection request from authenticated remote client 206 (410). After opening a port, a connection can be enabled upon receipt of a connection request from authenticated remote client 206 (412).

Figure 5:
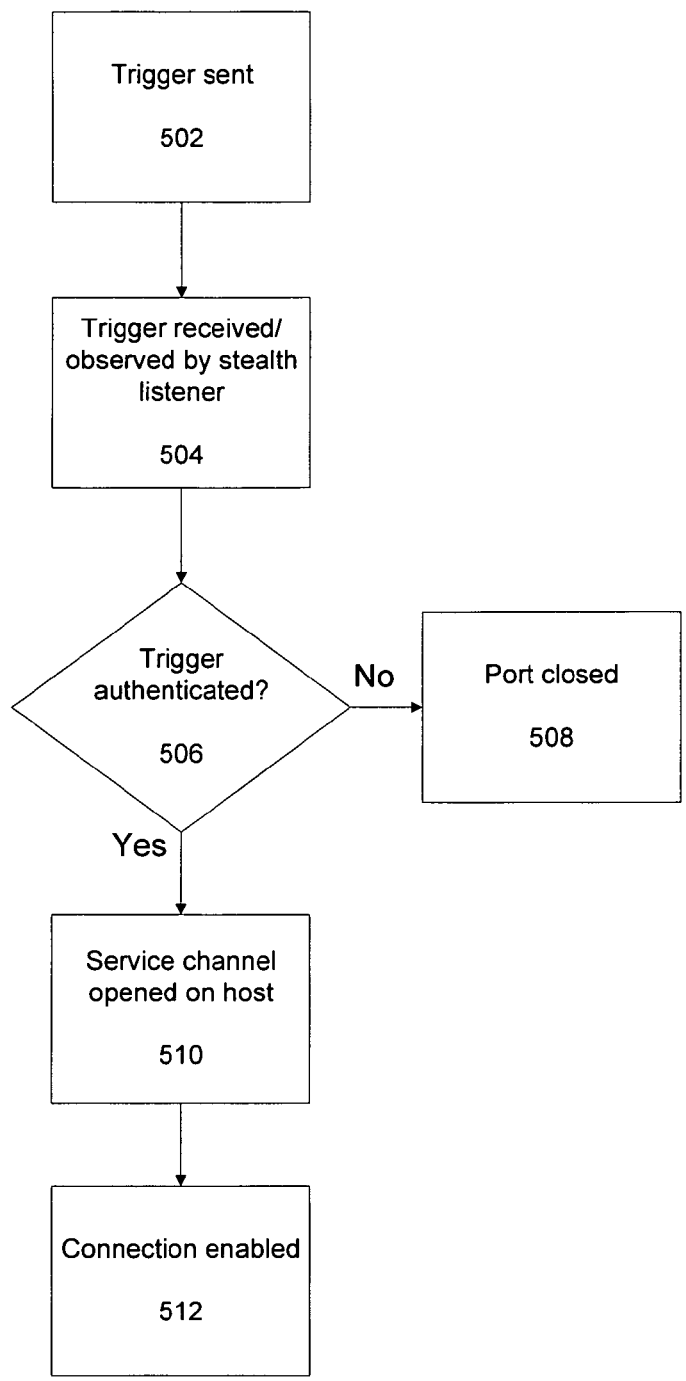
FIG. 5 illustrates a method for activating a service channel in accordance with an alternative embodiment of the present invention.

FIG. 5 illustrates a method for activating a service channel in accordance with an alternative embodiment of the present invention. In this example, a trigger 312 can be sent to a host 301 to contact a particular network service on a port (502). The trigger is received, in this example, by the stealth listener 303 (504). For example, the trigger can be received at a port on the host, which is monitored by stealth listener 303 via operating system 302. After receiving the trigger, a determination s made as to whether the trigger is properly authenticated (506). In this example, stealth listener 303 can be implemented in firewall 304 (FIG. 3) or another security application protecting host 202. In one embodiment, stealth listener 303 can serve as a first line of defense, intercepting packets before they reach host 301. This example provides an implementation that can enable numerous hosts to be protected by a single security application, such as stealth listener 303, instead of requiring installation on every host in an organization.

If a trigger is not properly authenticated, an indication may signal that the requested or targeted port is to be kept closed (508). If the trigger is authenticated, then operating system 302 may direct the opening of a service channel over which authenticated remote client 306 can establish a connection (510). Once opened, a connection can be enabled (512).

In this example, multiple hosts can be protected and directed by a single stealth listener 303. Thus, upon receipt of a request by a remote client (e.g., a server) to establish a connection with numerous hosts within an organization, if properly authenticated, connections can be enabled and directed by stealth listener 303. As discussed above, system variations can also be implemented by altering the response packet mechanism of a system in accordance with an embodiment of the present invention.

Figure 6:
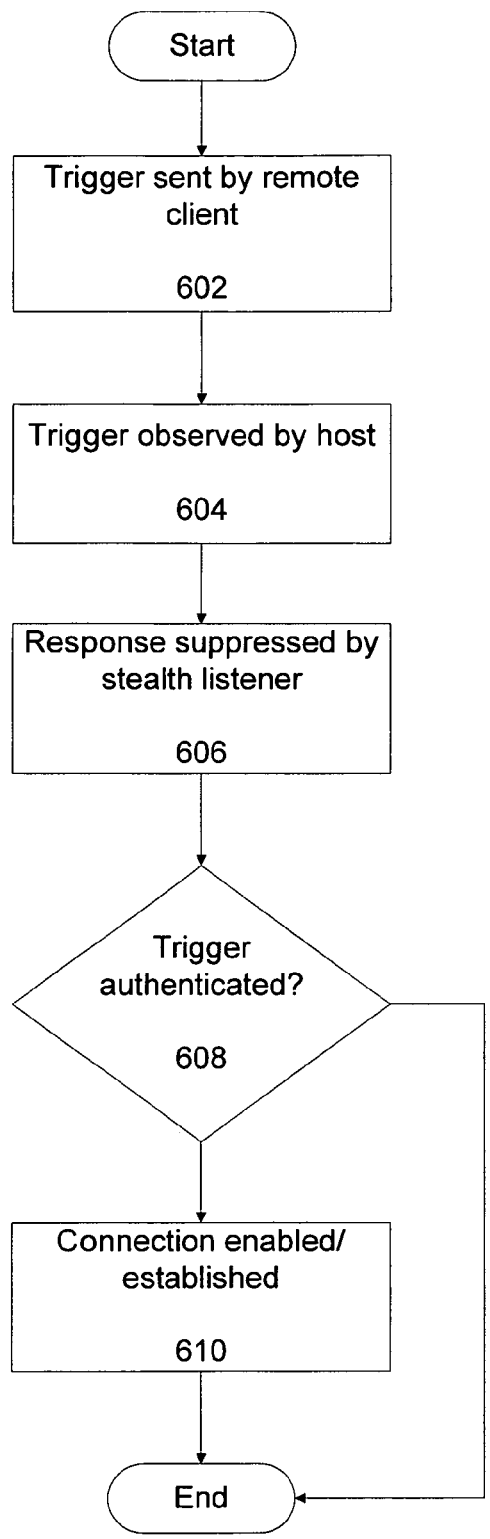
FIG. 6 illustrates a method for activating a service channel including suppression of response packets, in accordance with an embodiment of the present invention.

FIG. 6 illustrates a method for activating a service channel including suppression of response packets, in accordance with an embodiment of the present invention. Remote client 306, 308 can send a trigger 310 to host 301 (602). Host 301 and stealth listener 303 may observe the received trigger (604). Stealth listener 303 may be implemented on host 301, integrated with firewall 304, or configured in other embodiments.

Regardless of whether a trigger may be properly authenticated, stealth listener 303 can suppress any responsive packets to be sent back to remote client 306, 308 (606). By preventing a normal application response (and sending back one that indicates no service) from being sent, information is denied to remote clients 306, 308, deterring any further exploitation of host 301 or services located on its ports. Simultaneously, authentication of a trigger can then be attempted (608).

If the trigger is authenticated, then a connection can be enabled (610). In one embodiment, a one-time connection is enabled. If the trigger is not properly authenticated, then the port is kept closed or changed from an open state to a closed state. Other actions can be taken in response to an improper or invalid trigger, such as those described above. As soon as the connection is established, the service port closes.

Figure 7:
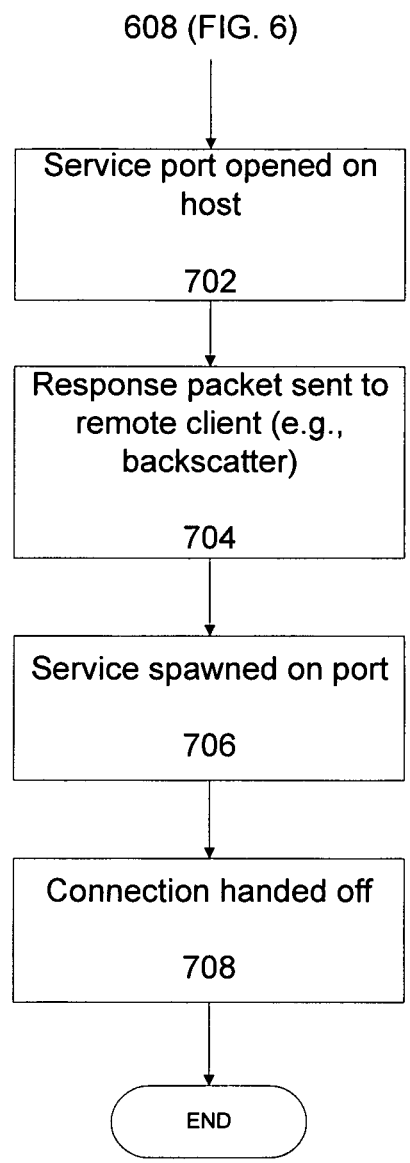
FIG. 7 illustrates a method for enabling a service channel on a host, in accordance with an embodiment of the present invention.

FIG. 7 illustrates a method for enabling a service channel on a host, in accordance with an embodiment of the present invention. Once authenticated, as described above, a port is opened (702). The port may have a service running on it, thus providing an opportunity for a remote client to establish a connection to exchange data. In this example, a response packet may be sent as a trigger to an authenticated remote client that the port is available for connection (704).

As described above, various transport mechanisms may be used to send this trigger, including mimicking backscatter effects in order to deceive observation of network traffic. Once sent, the service on the port is "spawned" or enabled/launched, thus ensuring that a remote client can establish a connection, if a connection request is received. If a connection is established between the remote client and the host then a handoff occurs and the port is no longer active. In the event a connection-oriented protocol is used, a handshake may occur wherein control data may be exchanged first between the host and the remote client.

Figure 8:
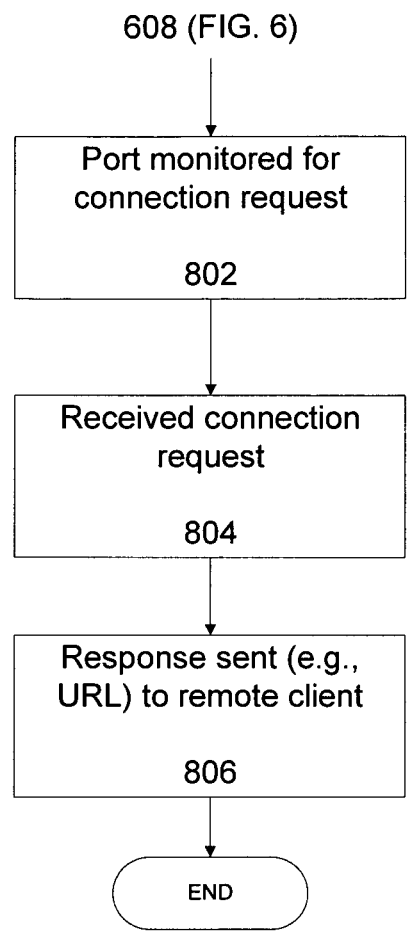
FIG. 8 illustrates a method for enabling and establishing a connection using a covert service channel in accordance with an embodiment of the present invention.

FIG. 8 illustrates a method for enabling and establishing a connection using a covert service channel in accordance with an embodiment of the present invention. After a remote client has been authenticated, a port may be monitored for a connection request (802). A connection request is received at a port(s) on a host (804). In response to the connection request, a URL, in this example, can be sent to the authenticated remote client directing it to a specific location for establishing a connection and retrieving data. In other embodiments, data can be exchanged directly rather than indirectly routing a remote client to another location, which can provide an additional layer of security.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for remotely activating a service channel comprising:
   receiving, at a stealth listener at a protected host, a trigger sent to the protected host by a remote client via a network, the trigger comprising a prescribed sequence of attempts to connect to the protected host at one or more trigger ports of the protected host, wherein at least one of the attempts to connect to the protected host comprises a full identification of a service port of the protected host, wherein the service port is different from the one or more trigger ports, and wherein the stealth listener receives network traffic at the one or more trigger ports and monitors the network traffic received at the one or more trigger ports for triggers;
   monitoring network traffic received at a predetermined one of the one or more trigger ports by an active listener, wherein the active listener is different from the stealth listener;
   authenticating the trigger based at least in part upon the trigger;
   opening the service channel based at least in part by allowing the remote client to establish a connection with the protected host via the service port based on the authentication; and
   generating a response in accordance with a detection of an event in the network traffic received at the predetermined one of the one or more trigger ports by the active listener.

2. The method as recited in claim 1, further comprising:
   sending to the remote client a first response packet indicating that the service channel has been opened when it is determined that the remote client that sent the trigger is an authenticated remote client; and
   sending to the remote client a second response packet different from the first response packet when it is determined that the remote client that sent the trigger is an unauthenticated remote client;
   wherein the stealth listener controls transmission of the second response packet and the second response packet masks the stealth listener.

3. The method as recited in claim 2, further comprising:
   mimicking a backscatter effect in connection with sending the response packet.

4. The method as recited in claim 1, wherein opening the service channel further includes spawning a service when the trigger is authenticated.

5. The method as recited in claim 1, further comprising:
   redirecting the remote client to another location when the trigger is authenticated.

6. The method as recited in claim 5, wherein redirecting the remote client to another location includes sending an address to the remote client.

7. A system for remotely activating a service channel comprising:
   a first communication interface configured to receive a trigger sent to a protected host by a remote client via a network, the trigger comprising a prescribed sequence of attempts to connect to the protected host at one or more trigger ports of the protected host, wherein at least one of the attempts to connect to the protected host comprises a full identification of a service port of the protected host, wherein the service port is different from the one or more trigger ports, and wherein the first communication interface receives network traffic at the one or more trigger ports and monitors the network traffic received at the one or more trigger ports for triggers;
   a second communication interface configured to monitor network traffic received at a predetermined one of the one or more trigger ports, wherein the second communication interface is different from the first communication interface; and
   a processor coupled to the communication interface and configured to:
     authenticate the trigger based at least in part upon the trigger;
     open the service channel based at least in part by allowing the remote client to establish a connection with the protected host via the service port based on the authentication; and
     generate a response in accordance with a detection of an event in the network traffic received at the predetermined one of the one or more trigger ports by the second communication interface.

8. The system as recited in claim 7, wherein the processor is further configured to:
   send to the remote client a first response packet indicating that the service channel has been opened when it is determined that the remote client that sent the trigger is an authenticated remote client; and
   send to the remote client a second response packet different from the first response packet when it is determined that the remote client that sent the trigger is an unauthenticated remote client;

wherein the stealth listener controls transmission of the second response packet and the second response packet masks the stealth listener.

9. The system as recited in claim 7, wherein the processor is further configured to spawn a service when the trigger is authenticated.

10. The system as recited in claim 7, wherein opening the service channel further includes sending an address from the protected host to the remote client for establishing the connection when the trigger is authenticated.

11. A method for remotely activating a service channel comprising:
sending a trigger from a remote client to a host, the trigger comprising a prescribed sequence of attempts to connect to the host at one or more trigger ports of the host, wherein at least one of the attempts to connect to the host comprises a full identification of a service port of the host, wherein the service port is different from the one or more trigger ports, and wherein a stealth listener at the host receives network traffic of the host and monitors the network traffic for triggers;
authenticating the trigger based at least in part upon the trigger;
sending a response packet from the host to the remote client, the response packet indicating a pre-defined time period;
waiting for the pre-defined time period;
sending a connection request to the service port of the host after the pre-defined time period has expired; and
establishing a connection between the remote client and the host over the service channel via the service port.

12. A computer program product for remotely activating a service channel, the computer program product being embodied in a non-transitory computer readable storage medium and comprising computer instructions for:
receiving, at a stealth listener at a protected host, a trigger sent to the protected host by a remote client via a network, the trigger comprising a prescribed sequence of attempts to connect to the protected host at one or more trigger ports of the protected host, wherein at least one of the attempts to connect to the protected host comprises a full identification of a service port of the protected host, wherein the service port is different from the one or more trigger ports, and wherein the stealth listener receives network traffic at the one or more trigger ports and monitors the network traffic received at the one or more trigger ports for triggers;
monitoring network traffic received at a predetermined one of the one or more trigger ports by an active listener, wherein the active listener is different from the stealth listener;
authenticating the trigger based at least in part upon the trigger;
opening the service channel based at least in part by allowing the remote client to establish a connection with the protected host via the service port based on the authentication; and
generating a response in accordance with a detection of an event in the network traffic received at the predetermined one of the one or more trigger ports by the active listener.

13. The computer program product as recited in claim 12, further comprising computer instructions for:
sending to the remote client a first response packet indicating that the service channel has been opened when it is determined that the remote client that sent the trigger is an authenticated remote client; and
sending to the remote client a second response packet different from the first response packet when it is determined that the remote client that sent the trigger is an unauthenticated remote client;
wherein the stealth listener controls transmission of the second response packet and the second response packet masks the stealth listener.

14. The computer program product as recited in claim 12, wherein opening the service channel further includes spawning a service when the trigger is authenticated.

15. The computer program product as recited in claim 12, further comprising
computer instructions for redirecting the remote client to another location when the trigger is authenticated.

16. The computer program product as recited in claim 15, wherein redirecting the remote client to another location includes sending an address to the remote client.

17. The method as recited in claim 1, further comprising:
suppressing a response to the trigger from the protected host to the remote client regardless of whether the trigger has been authenticated.

18. The system as recited in claim 7, wherein the processor is further configured to suppress a response to the trigger from the protected host to the remote client regardless of whether the trigger has been authenticated.

19. The computer program product as recited in claim 12, further comprising computer instructions for suppressing a response to the trigger from the protected host to the remote client regardless of whether the trigger has been authenticated.

20. The method as recited in claim 17, wherein suppressing a response to the trigger comprises preventing an application associated with a port via which the trigger was received from sending to the remote client an application response that the application is configured to send in response to the trigger.

* * * * *